US009096009B2

(12) United States Patent
Anbarasu et al.

(10) Patent No.: US 9,096,009 B2
(45) Date of Patent: Aug. 4, 2015

(54) METHOD FOR FORMING A POLYMER PART (75) Inventors: Ramasamy Anbarasu, Karnataka (IN);
Ashwit Dias, Goa (IN); Om Prakash,
Karnataka (IN); Milind S. Paradkar,
Karnataka (IN); Daniel Wardell Sowle,
Dalton, MA (US); Anshuman Tripathi,
Allahabad (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1499 days.

(21) Appl. No.: 12/258,900

(22) Filed: Oct. 27, 2008

(65) Prior Publication Data

US 2009/0115104 A1 May 7, 2009

Related U.S. Application Data (60) Provisional application No. 60/982,914, filed on Oct. 26, 2007.

(51) Int. Cl.
*B29C 45/73* (2006.01)
*B29C 33/04* (2006.01)
*B29C 33/06* (2006.01)
*B29C 35/08* (2006.01)

(52) U.S. Cl.
CPC ............. *B29C 45/73* (2013.01); *B29C 33/04* (2013.01); *B29C 33/06* (2013.01); *B29C 2035/0811* (2013.01); *B29C 2035/0816* (2013.01); *B29C 2045/7368* (2013.01); *B29C 2045/7393* (2013.01)

(58) Field of Classification Search
USPC ........................................ 264/403
See application file for complete search history.

(56) References Cited

U.S. PATENT DOCUMENTS

| 2,393,541 | A | 5/1943 | Kohler |
| 2,454,847 | A | 11/1948 | Slack |
| 2,508,462 | A | 5/1950 | Marshall |
| 2,705,342 | A | 4/1955 | James |
| 2,796,634 | A | 6/1957 | Chellis |
| 2,979,773 | A | 4/1961 | Bolstad |
| 2,984,887 | A | 5/1961 | Thiess |
| 3,185,432 | A | 5/1965 | Hager, Jr. |

(Continued)

FOREIGN PATENT DOCUMENTS

| DE | 7326694 U | 12/1973 |
| DE | 2734346 A1 | 2/1979 |

(Continued)

OTHER PUBLICATIONS

English abstract of JP 63-78720 A.*

(Continued)

*Primary Examiner* — Benjamin Schiffman
(74) *Attorney, Agent, or Firm* — Cantor Colburn LLP (57) ABSTRACT Various systems and methods for forming a polymer part with utilizing heating fluid are provided. In one embodiment of the present invention a method for forming polymer includes heating the mold apparatus with a first heat energy source comprising heating fluid to a first mold temperature, and then heating the mold apparatus with a second energy source which is different than the first energy source. The second energy source heats the mold surface to a second mold temperature greater than the first mold temperature to form the part to achieve a desired surface finish of the polymer part.

28 Claims, 3 Drawing Sheets

(56) References Cited

U.S. PATENT DOCUMENTS

| | | | |
|---|---|---|---|
| 3,488,411 A | 1/1970 | Goldman | |
| 3,600,248 A | 8/1971 | Mojonnier et al. | |
| 3,671,168 A | 6/1972 | Nussbaum | |
| 3,691,339 A | 9/1972 | Cachat | |
| 3,763,293 A | 10/1973 | Nussbaum | |
| 3,832,433 A | 8/1974 | Schaffer et al. | |
| 3,974,250 A | 8/1976 | Cottis | |
| 4,044,188 A | 8/1977 | Segal | |
| 4,060,364 A | 11/1977 | Gras | |
| 4,201,742 A | 5/1980 | Hendry | |
| 4,217,514 A | 8/1980 | Simazaki et al. | |
| 4,340,551 A | 7/1982 | Wada et al. | |
| 4,358,306 A | 11/1982 | Okamoto | |
| 4,390,485 A | 6/1983 | Yang | |
| 4,406,703 A | 9/1983 | Guthrie et al. | |
| 4,439,492 A | 3/1984 | Wada et al. | |
| 4,452,943 A | 6/1984 | Goldman | |
| 4,486,641 A | 12/1984 | Ruffini | |
| 4,533,576 A | 8/1985 | Tanahashi et al. | |
| 4,548,773 A | 10/1985 | Suh et al. | |
| 4,563,145 A | 1/1986 | de Meij | |
| 4,716,072 A | 12/1987 | Kim | |
| 4,969,968 A | 11/1990 | Leatherman | |
| 5,041,247 A | 8/1991 | Kim | |
| 5,047,198 A | 9/1991 | Kim | |
| 5,062,786 A | 11/1991 | Arai | |
| 5,064,597 A | 11/1991 | Kim | |
| 5,160,396 A | 11/1992 | Jensen | |
| 5,176,839 A | 1/1993 | Kim | |
| 5,204,181 A | 4/1993 | Suzuki | |
| 5,219,642 A | 6/1993 | Meakin | |
| 5,232,653 A | 8/1993 | Addeo et al. | |
| 5,234,637 A | 8/1993 | Reymann et al. | |
| 5,238,627 A | 8/1993 | Matsuhisa | |
| 5,260,017 A | 11/1993 | Giles, Jr. | |
| 5,272,720 A | 12/1993 | Cignetti et al. | |
| 5,324,473 A | 6/1994 | Baresich | |
| 5,338,497 A | 8/1994 | Murray et al. | |
| 5,362,226 A | 11/1994 | Kataoka et al. | |
| 5,376,317 A | 12/1994 | Maus | |
| 5,410,132 A | 4/1995 | Gregg et al. | |
| 5,416,303 A | 5/1995 | Grooms | |
| 5,458,846 A | 10/1995 | Carroll | |
| 5,489,410 A | 2/1996 | Baumgartner et al. | |
| 5,530,227 A | 6/1996 | Matsen et al. | |
| 5,535,980 A | 7/1996 | Baumgartner et al. | |
| 5,591,369 A * | 1/1997 | Matsen et al. | 219/633 |
| 5,645,744 A | 7/1997 | Matsen et al. | |
| 5,654,246 A | 8/1997 | Newkirk | |
| 5,683,608 A | 11/1997 | Matsen et al. | |
| 5,688,426 A | 11/1997 | Kirkwood et al. | |
| 5,718,863 A | 2/1998 | McHugh | |
| 5,728,474 A | 3/1998 | Niemeyer et al. | |
| 5,762,972 A | 6/1998 | Byon | |
| 5,770,136 A | 6/1998 | Huang | |
| 5,837,183 A | 11/1998 | Inoue et al. | |
| 5,945,042 A | 8/1999 | Mimura et al. | |
| 6,023,054 A | 2/2000 | Johnson | |
| 6,176,839 B1 | 1/2001 | Deluis et al. | |
| 6,237,789 B1 | 5/2001 | Zhu | |
| 6,309,582 B1 * | 10/2001 | Wu | 264/403 |
| 6,322,735 B1 | 11/2001 | Yamaki | |
| 6,461,801 B1 * | 10/2002 | Wang | 430/329 |
| 6,759,781 B1 | 7/2004 | Bushko et al. | |
| 6,960,860 B1 | 11/2005 | DeCristofaro et al. | |
| 7,132,632 B2 | 11/2006 | Huang | |
| 7,135,653 B2 | 11/2006 | Routberg et al. | |
| 2002/0031963 A1 | 3/2002 | Mead | |
| 2002/0113066 A1 | 8/2002 | Stark | |
| 2003/0006535 A1 | 1/2003 | Hennessey | |
| 2003/0021917 A1 | 1/2003 | Hotaka | |
| 2003/0038405 A1 | 2/2003 | Bopp | |
| 2003/0091781 A1 | 5/2003 | Arakawa | |
| 2003/0118315 A1 | 6/2003 | Hewak | |
| 2003/0141609 A1 | 7/2003 | Jia | |
| 2004/0041303 A1 | 3/2004 | Kim | |
| 2004/0048463 A1 | 3/2004 | Haematsu | |
| 2004/0058027 A1 | 3/2004 | Guichard et al. | |
| 2004/0129924 A1 | 7/2004 | Stark | |
| 2004/0130057 A1 | 7/2004 | Mehrabi | |
| 2004/0188418 A1 | 9/2004 | Aisenbrey | |
| 2004/0212109 A1 * | 10/2004 | Fujimoto et al. | 264/1.32 |
| 2004/0222566 A1 | 11/2004 | Park | |
| 2004/0256383 A1 | 12/2004 | Fischer | |
| 2005/0003721 A1 | 1/2005 | Greulich | |
| 2005/0006380 A1 | 1/2005 | Kagan | |
| 2005/0010275 A1 | 1/2005 | Sahatjian | |
| 2005/0011883 A1 | 1/2005 | Clothier | |
| 2005/0035115 A1 | 2/2005 | Anderson et al. | |
| 2005/0179157 A1 * | 8/2005 | Muranaka et al. | 264/40.6 |
| 2005/0245193 A1 | 11/2005 | Guichard et al. | |
| 2007/0267405 A1 | 11/2007 | Feigen-Blum et al. | |
| 2008/0303194 A1 | 12/2008 | Anbarasu et al. | |

FOREIGN PATENT DOCUMENTS

| | | |
|---|---|---|
| DE | 3701387 | 7/1988 |
| DE | 4337483 C1 | 4/1995 |
| EP | 0415207 | 3/1991 |
| EP | 0415207 A2 | 3/1991 |
| EP | 1120219 | 8/2001 |
| EP | 1275491 A1 | 1/2003 |
| FR | 2867414 A1 | 9/2005 |
| GB | 2134839 | 8/1984 |
| GB | 2310822 A | 9/1997 |
| JP | 63078720 A | 4/1988 |
| JP | 2004220309 A | 8/2004 |
| WO | WO 9303080 A2 | 2/1993 |
| WO | 9413454 | 6/1994 |
| WO | WO 9413454 A1 | 6/1994 |
| WO | WO 9613368 A1 | 5/1996 |
| WO | WO 9624413 A1 | 8/1996 |
| WO | WO 0208316 A1 | 1/2002 |
| WO | WO 02085601 A1 | 10/2002 |
| WO | 03035351 | 5/2003 |
| WO | WO 03035351 A1 | 5/2003 |
| WO | WO 03043769 A2 | 5/2003 |
| WO | 2004048463 | 6/2004 |
| WO | WO 2004048463 A1 | 6/2004 |
| WO | WO 2005118248 A2 | 12/2005 |
| WO | WO 2008154379 A1 | 12/2008 |

OTHER PUBLICATIONS

Translation of JP 63078720 A.*
English abstract of JP 63-78720 A, Apr. 8, 1988.*
Translation of JP 63078720 A, Jun. 2010.*
German Patent No. 3701387A1; Publication Date: Jul. 28, 1988; Abstract Only; 1 Page.
International Application No. 9512966; Publication Date: May 11, 1995; Abstract Only; Equivalent to DE4337483; 1 Page.
U.S. Department of Energy: Energy Efficiency and Renewable Energy. "Energy Savers: Phenolic Foam Insulation Material" (Feb. 24, 2009). pp. 1-2. Link: http://www.energysavers.gov/your_home/insulation_airsealing/index.cfm/mytopic=11730.
French Patent No. 2867414(A1); Publication Date: Sep. 16, 2005; Abstract Only; 1 Page.
Japanese Patent No. 2004220309(A); Publication Date: Aug. 5, 2004; Abstract Only; 1 Page.
Japanese Patent No. 63078720(A); Publication Date: Apr. 8, 1988; Abstract Only; 1 Page.
Plastic Technology; vol. 34; Jun. 1988; p. 150.
Polym. Eng. Sci.; vol. 34 (11); 1994; p. 894.
International Search Report; International Application No. PCT/US2008/081320; International Filing Date: Oct. 27, 2008; Date of Mailing: Jan. 29, 2009; 7 Pages.
Written Opinion of the International Searching Authority; International Application No. PCT/US2008/081320; International Filing Date: Oct. 27, 2008; Date of Mailing: Jan. 29, 2009; 7 Pages.

* cited by examiner

METHOD FOR FORMING A POLYMER PART

CROSS REFERENCE TO RELATED APPLICATION

This application claims the priority of U.S. Provisional Application Ser. No. 60/982,914, filed Oct. 26, 2007, which is incorporated herein by reference.

FIELD OF THE INVENTION

The present invention relates to system and method for forming polymer into parts with the use of heating fluid to heat the mold. More specifically, the present invention relates to a system and method for forming polymer parts using temperature cycling.

BACKGROUND

Conventional molding techniques used to produce a desired part involve conducting heat to the mold body such that the surface temperatures of the mold cavity within the mold body allows for adequate flow of polymer to fill the cavity. It has become increasingly desirable to cycle the mold to a higher temperature to improve the surface or cosmetic quality of the part in addition to the physical properties of the part. However, temperature cycling to heat and cool the mold has been found to lengthen the cycle time due to the time required to supply and remove the thermal energy needed to raise and lower the temperature of the mold body.

Induction heating is one approach which has been used to achieve faster heating of the mold. Previous methods of induction heating used to mold or form polymer employ a conductive coil which surrounds the external surfaces of the mold. In another example, an induction coil that is inserted between the mold halves which heats the mold while the mold is open and then is retracted before closing the mold to produce the part. Other previous methods have employed inductive heating using conductive polymers which include magnetic reinforcements, also known as susceptors, dispersed within the polymer matrix. The induction heating coils heat the conductive polymer matrix disposed between two non-magnetic mold surfaces. The improved cycle times of induction heating in some cases, have justified the use of plastic as a replacement for larger structural parts such as metal body panels in automobiles, for example.

Other techniques which have been used to achieve rapid heating of the mold include infrared heating, resistive heating, laser heating and microwave heating, for example. These heating techniques allow for directed heating of specific regions of the mold to achieve higher temperatures than the bulk mold. These regions of the mold are typically those which are come into contact with and/or are closer to the polymer part surface. Hence less energy is required to achieve the mold surface temperatures required for good cosmetic quality/aesthetics. Also, as the rate of the heating is faster, it is possible to produce a polymer part in a much faster cycle time. The molding cycle times for producing polymer parts are not only improved by the above rapid heating techniques, but cycle time can also be reduced by cooling the mold prior to ejection of the part. That is, once the polymer is heated to the desirable temperature for forming the part, a cooling medium can be passed through the mold body to cool down the mold to a predetermined release or ejection temperature. Nevertheless, although these heating methods which may quickly heat the mold surface, can still result in cycle times which are prohibitive for applications requiring large parts and/or high part volumes.

SUMMARY

The present invention provides for a system and method for producing polymer parts using at least two different heat energy sources to heat the mold and the polymer.

In one embodiment, the present invention provides a system for producing polymer parts. The system includes a mold apparatus and two different heat energy sources which provide heat to the mold apparatus. A first energy source provides heating fluid which flows into contact with the mold apparatus to increase the temperature of the mold, and a second heat energy source provides heat energy which increases the mold temperature beyond the first mold temperature by the heating fluid, to form the polymer. In another embodiment the system further includes a cooling medium which flows into contact with the mold apparatus to cool the mold after the polymer is formed into the desired shape.

In another embodiment of the present invention, the method for forming polymer comprises the steps of heating the mold apparatus with a first heat energy source comprising heating fluid and also heating the mold apparatus with a second energy source. The second energy source heats the mold surface to a mold temperature greater than the mold temperature achieved by the heating fluid. The use of heating fluid in conjunction with an alternative heat source can reduce peak power requirements demanded by a second energy source. The second energy source heats the mold to a temperature at least as great as a predetermined forming temperature, wherein the forming temperature can vary depending upon the material to be formed and/or the desired surface finish of the polymer part. In another embodiment, the method further comprises placing polymer into a mold cavity of the mold after the second energy source has been activated and forming the polymer part. In another embodiment the method further includes cooling the mold, opening the mold to release the polymer part from the mold, and heating the mold while the mold is open.

In another embodiment, the method for forming polymer comprises heating the mold by heating fluid, followed by heating the mold by induction heat to a mold surface temperature which exceeds the mold temperature raised by the heating fluid. In another embodiment, the method further comprises placing polymer into the mold cavity and cooling the mold surface to a predetermined release or ejection temperature, and cooling the mold surface by passing cooling medium through fluid passageways of the mold.

In yet another embodiment the method of forming polymer further includes opening the mold for release of the part from the mold, and heating the open mold with the heating fluid during a period of time that ranges from opening and the mold to closing the mold. Heating the open mold during release or ejection of the polymer part reduces the overall cycle time in processing.

DESCRIPTION OF THE DRAWINGS

The various embodiments of the present invention can be understood by the following drawings and figures. The components are not necessarily to scale.

DETAILED DESCRIPTION

Figure 1:
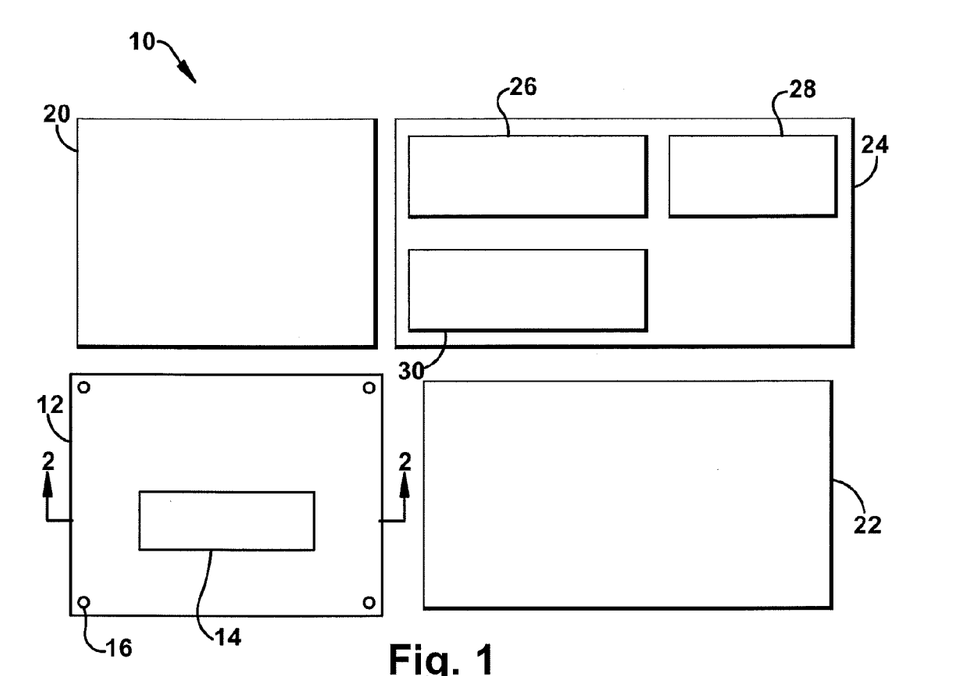
FIG. 1 is a schematic diagram of a system for producing polymer parts according to an embodiment of the present invention.

FIG. 1 is a schematic top view illustration of a system 10 for producing polymer parts, according to an embodiment of the present invention. The system 10 includes a platten 12 which supports a mold apparatus 14 for forming polymer which can be open and closed via the rods 16 of platten 12. System 10 also includes heat energy source 20 which provides heat energy to mold apparatus 14 the details of which will be further described. For example, heat source 20 can be an induction heating unit which provides energy to mold apparatus 14. A pre-heat oven 22 is optionally included for applications which involve pre-heating of the polymer prior to molding, for example, in a thermoforming operation in which the polymer is a solid and is heated prior to placement in the mold. Heat transfer equipment 24 provides hot and cool medium to the mold apparatus during the molding cycle. The heat transfer equipment 24 includes a heating fluid supply reservoir 26 and a cooling medium supply reservoir 28 and optionally an air purge 30 to circulate or purge the hot and cold mediums from the mold apparatus 14, as will be further described.

Polymer disposed within a mold apparatus 14 is formed by heating the mold to a predetermined forming temperature and then forming the polymer in the mold. The term "forming temperature" used in several instances herein can vary depending upon the type of polymer being formed and the desired surface finish. Therefore, the forming temperature can vary and can be a mold temperature which is at least as high as the melt temperature of a polymer which is crystalline or semi-crystalline, or it can be a mold temperature that ranges from about 30° C. to about 100° C. above the glass transition temperature, Tg, of an amorphous polymer, for example, and the forming temperature can also be the mold temperature which achieves the desired surface finish of the part, and will be know by one of ordinary skill in the art. The term "mold temperature" refers to at least a surface of the mold, for example a surface of the mold cavity, and can be a surface on a portion of the mold, for example the top mold portion or the bottom mold portion, or both. The mold apparatus for forming polymer can be used for several types of thermoforming and molding methods. For example, thermoforming methods include vacuum forming, plug assist thermoforming, pressure forming, match metal forming, etc. In addition, the mold apparatus 14 can be used for several types of molding, such as injection molding, compression molding, and plastic stamping.

In one embodiment of the invention, a method for forming polymer comprises the steps of heating a mold with a first energy source, heating the mold with a second energy source which is different than the first energy source and turning off the first energy source while the mold is being heated to a higher temperature. The first energy source is a heating fluid which contacts the mold and raises the temperature of the mold to a temperature that is less than the forming temperature of the polymer. The second energy source heats the mold to a temperature above the mold temperature achieved by the heating fluid, to a temperature that is at least as high as the forming temperature, or slightly above the forming temperature to produce a polymer part which can have a high quality surface finish or "cosmetic" surface. The term "fluid" in heating fluid conforms to the well established meaning of a liquid or a gas or a mixture of liquid and gas. Examples of heating fluid include, but are not limited to, water and oil, for example. The temperature of the fluid can be raised such that the fluid is superheated and having a temperature which is a function of the elevated pressure, as is known by those of ordinary skill in the art.

Figure 2:
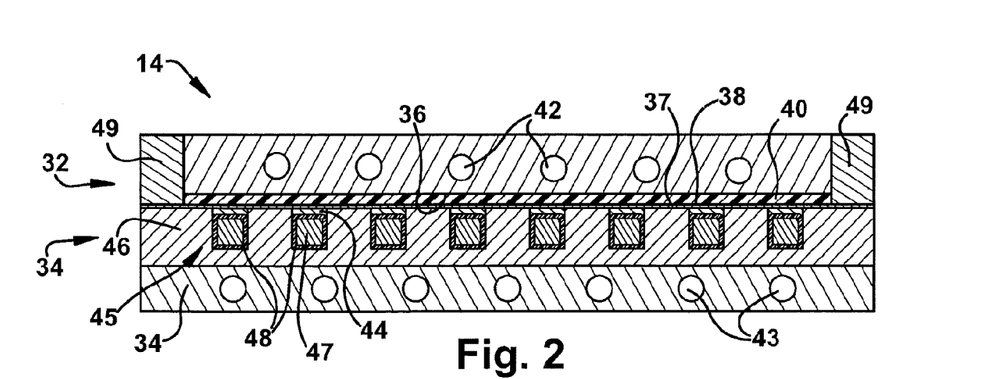
FIG. 2 is a cross-sectional view of an apparatus for forming polymer of the system of FIG. 1, according to an embodiment of the present invention.

FIG. 2 is a cross-sectional illustration of a mold apparatus 14 for forming polymer taken along lines 2-2 of FIG. 1. The mold apparatus 14 opens and closes during the molding cycle and either or both the top mold portion 32 and bottom mold portion 34 are moved by platten 12 (FIG. 1) along rods 16 (FIG. 1). The top mold surface 36 of top mold portion 32 and the bottom mold surface 38 of bottom mold layer 37 interface with polymer 40 when the mold apparatus 14 is in a closed position as shown. The polymer may be an unfilled, neat resin or it may contain reinforcement fibers and/or mineral reinforcement. It might also consist of multiple layers, which may or may not be of the same composition. In turn each of the layers might be unfilled, neat resin or may contain reinforcement fibers and/or mineral reinforcements.

The mold apparatus 14 is shown equipped with induction heating unit 45 at least partially embedded within the mold apparatus. However, it should be understood that alternative mold apparatus having alternative heating techniques and energy sources are also contemplated. Sources of heat energy can include, but are not limited to, infrared heaters, resistive heaters, lasers, microwave heaters, for example. In alternative embodiments, for example, radiation-based heat sources can be placed between the mold halves, or alternatively, resistive heating elements can be embedded within the mold. As shown in FIG. 2 bottom mold portion 34 of mold apparatus 14 includes induction heating unit 45 which includes stator 46 and induction heating coils 47 which are supported by slots 48 of the stator. Several arrangements of coils are possible, and one or more coils can be positioned in transverse loops or vertical loops arrangements about stator 46. In any of the embodiments, the induction heating unit can be connected to the heat energy source 20 (FIG. 1), for example a frequency generator, in a single-phase or multi-phase, or a single-pole and multi-pole arrangement. Induction heating units which are partially embedded in the mold apparatus are described in pending U.S. Patent Application 60/942,800 filed on Jun. 8, 2007 and which is hereby incorporated by reference herein.

It should be understood, however, that alternative mold apparatuses may have alternative induction heating units in which different coil arrangements are possible. For example, system 10 can have a mold apparatus in which the induction heat coils surround the external surfaces of the mold. In another example, the mold apparatus may include an induction coil that is inserted between the mold halves which heats the mold while the mold is open and then is retracted before closing the mold to produce the part.

Referring still to FIG. 2 according to an example embodiment shows the induction heating unit 45 which includes stator 46 and induction heating coils 47 is at least partially embedded in the bottom mold portion 34 and rapidly heats the top mold surface 36. The top mold surface 36 is made of a magnetic material which is a high eddy current loss or core loss material, whereas the bottom mold surface 38 is made of a low eddy current and hysteresis loss material. Therefore, when current flows through the high-frequency induction heating coils 47, the majority, greater than or equal to about 50%, of induction heat energy is dissipated by top mold portion 32. Depending upon the construction, arrangement and material composition of the mold apparatus 14, greater than or equal to about 80% of the power, and in other examples greater than or equal to about 90% of the heat energy generated by the induction heating unit 45 is applied to the top mold surface 36. That is the majority of the magnetic flux generated by the induction heating unit 45 is caused to magnetically link to the top mold portion 32 and directed to the top mold surface 36.

Materials used in the top mold portion 32 having top mold surface 36 are magnetic and both electrically and thermally conductive. Magnetic materials are generally defined as having a permeability of greater than about 1.0. The top mold surface 36 of top mold portion 32 has a saturation flux density which is greater than about 0.2 Tesla, in another example greater than about 0.4 Tesla, and in yet alternative examples, ranges from about 0.4 Tesla to about 2.5 Tesla. Magnetic materials include, but are not limited to, iron, steel, carbon, magnesium and alloys thereof. Magnetic materials having high thermal conductivity will improve the heat rate of the top mold surface 36. Examples of magnetic materials used for the top mold surface 36 include, but are not limited to, steel such as, for example H13, S7, 4140, P20, and 400 series Stainless Steel. Such magnetic materials are well-known in the art and should be selected to have suitable mechanical strength to withstand the pressure of the polymer forming process. The thickness of the top mold portion 32 is generally greater than about 5 millimeters, and can often range from about 5 millimeters to about 30 millimeters, for example.

The material composition of the bottom mold surface 38 which interfaces with polymer 40 can vary based on the alternative constructions of the bottom mold portion 34. For example, FIG. 2 shows that bottom mold surface 38 is the uppermost surface of bottom mold layer 37. In an alternative construction, bottom mold layer 37 is not present and the bottom mold surface 38 is comprised of discrete areas of stator 46 and interposed slot insulator 44 which interface with polymer 40. In this arrangement the coils 47 may be in closer proximity to polymer 40 and upper mold surface 36. In any of the alternative constructions of the bottom mold portion 34, however, the bottom mold surface, for example 37, has the mechanical strength to withstand the pressure and resist deformation during the polymer formation process.

The bottom mold surface, whether it is surface 37 of bottom mold portion 34 or uppermost surfaces of stator 46 and slot insulators 44, can be made of a magnetic or non-magnetic material or both. If the bottom mold surface is magnetic, the magnetic material which makes up the bottom mold surface has a saturation flux density that ranges from about 0.4 Tesla to about 2.2 Tesla. Such a saturation flux density enables the majority of the magnetic flux generated by the inductive heat unit 45 to magnetically link to the top mold portion 32 rather than dissipate in bottom mold portion 34. Therefore, examples of low power loss materials of bottom mold surface can include, but are not limited to, magnetic materials such as cobalt-based materials, amorphous materials, ceramics, beryllium, and mixtures thereof, as well as non-magnetic materials such as ceramics, glass, wood, polymers, copper, aluminum, and non-magnetic stainless steel such as 300 Series stainless steel, and mixtures thereof, for example.

Stator 46 can be a solid or a laminated magnetic material. If laminated, the stator 45 has a series of magnetic layers having a thickness ranging from a few microns to a few hundred microns. Each layer is coated with organic or non-organic electrically insulating material so that the eddy current losses through the stator 45 are low. Materials which can be used for the stator include, but are not limited to, silicon steel, ferrite, permandur, hyperco, amorphous materials, and mixtures thereof, for example.

The slot insulators 44 disposed within slots 48 of stator 46 are made of a non-magnetic material. The non-magnetic material prevents magnetic flux shunting horizontally through stator 45, along the x-axis, between slots 48. The non-magnetic slot insulators 44 therefore channel the magnetic flux produced in the coils 47 and stator 46 to link with the top mold surface 36. Slot insulators can be integral or a separate component from bottom mold layer 37 such that slot insulators 44 are protrusions of layer 37.

Coil 47 is made from solid metallic material, for example copper and aluminum, or other non-magnetic, and electrically conductive material. Coil 47 is electrically insulated from the stator 46 by insulation which surrounds it. Materials which make up insulation include several thermoplastic and thermoset materials and are well-known. In an alternative embodiment, the coil 47 is a super conductor. Examples of super conductors include niobium-based materials.

Use of coil conductors with low resistance reduces loss in the coil 47, reduces the cooling requirement, and reduces the power level of the frequency generator. An example of a low resistance coil is Litz wire. Litz wire is comprised of thousands of fine copper wires, each having a small diameter, for example, each strand being about 0.001 inch in diameter, and electrical insulation applied around each strand. Litz wire construction is designed to minimize the power losses exhibited in solid conductors due to the tendency of the high frequency current to concentrate at the surface of the conductor. Litz wire construction counteracts this effect by increasing the amount of surface area without significantly increasing the size of the conductor.

In addition, induction heating unit include coils made of hollow tubing capable of carrying a cooling medium. The hollow tubing when made of a material which is an electrical conductor, for example copper or aluminum, is capable of carrying sufficiently large currents.

Upper mold portion 32 and bottom mold portion 34 further include fluid passageways 42 and 43, respectively, for purposes of heating and cooling the mold during the polymer forming cycle which will be further described. Heat insulators 49 can be used to thermally prevent heat loss from the external surfaces of the mold portions. Fluid passageways 42 and 43, for example, are in fluid communication with the heating fluid supply reservoir 26 of system 10 (FIG. 1) and the cooling medium supply reservoir 28 of system 10 (FIG. 1). The heating fluid and the cooling medium can flow through the fluid passageways at different times as will be described, however, they may flow through the same or separate fluid passageways. System 10 (FIG. 1) can further include conduit which connects the heating fluid supply reservoir 26 and the cooling medium supply reservoir 28 to the fluid passageways 42, 43, along separate flow streams to separate fluid passageways of the mold, or along intersecting passageways such that the heating fluid and the cooling medium flow through overlapping or the same fluid passageways of the mold.

In the embodiment described with respect to FIG. 2, top mold surface 36 is heated rapidly to a high temperature, for example, the forming temperature described above. The forming temperature can be at or above the melt temperature $T_m$, or above the glass transition temperature $T_g$, for example, of the polymer 40, or may be a mold temperature which achieves the desired surface finish of the polymer part. The heated polymer then conforms to the geometric shape of the top mold surface 36 to produce the "cosmetic surface" of the polymer part. The cosmetic surface of the polymer part can be extremely high gloss, for example, meeting the standards of a Class A surface finish. The temperature caused by generation of heat in the bottom mold surface 38 is lower, and in some examples, substantially lower than top mold surface 36 and produces a "non-cosmetic" surface of the part where the surface quality is more desirable on one side of the part than the other. Therefore, an example system 10 described, a mold apparatus 14 having a single-sided induction heating unit in close proximity with the magnetic mold surface 36 can allow for a reduction in the input power to the mold apparatus.

It should also be understood that system and method of the present invention pertains to several alternative orientations of the mold, such as for a mold apparatus opens along alternative axes, such as vertical or horizontal axes. Also, the induction heating unit need not be located in the lower mold portion 14. In an alternative example embodiment the induction heating unit 35 is located in the top mold portion 32 to rapidly heat the magnetic mold surface of the bottom mold portion 34. In any of the several example embodiments described herein, the mold half or mold portion which supports the induction heating unit heats a magnetic mold surface of the opposing mold portion.

Polymer 40, can be molten polymer when it is injected into the mold or a solid polymer work piece, for example, and placed between the top mold portion 32 and the bottom mold portion 34. The top mold surface 36 and bottom mold surface 38 are separated a distance equal to the thickness of polymer 40 when the mold apparatus 14 in a closed position which is a distance which allows the magnetic flux from the induction coils of the bottom mold portion to link to the top mold surface 36 of the top mold portion to provide additional heat to the polymer.

Figure 3:
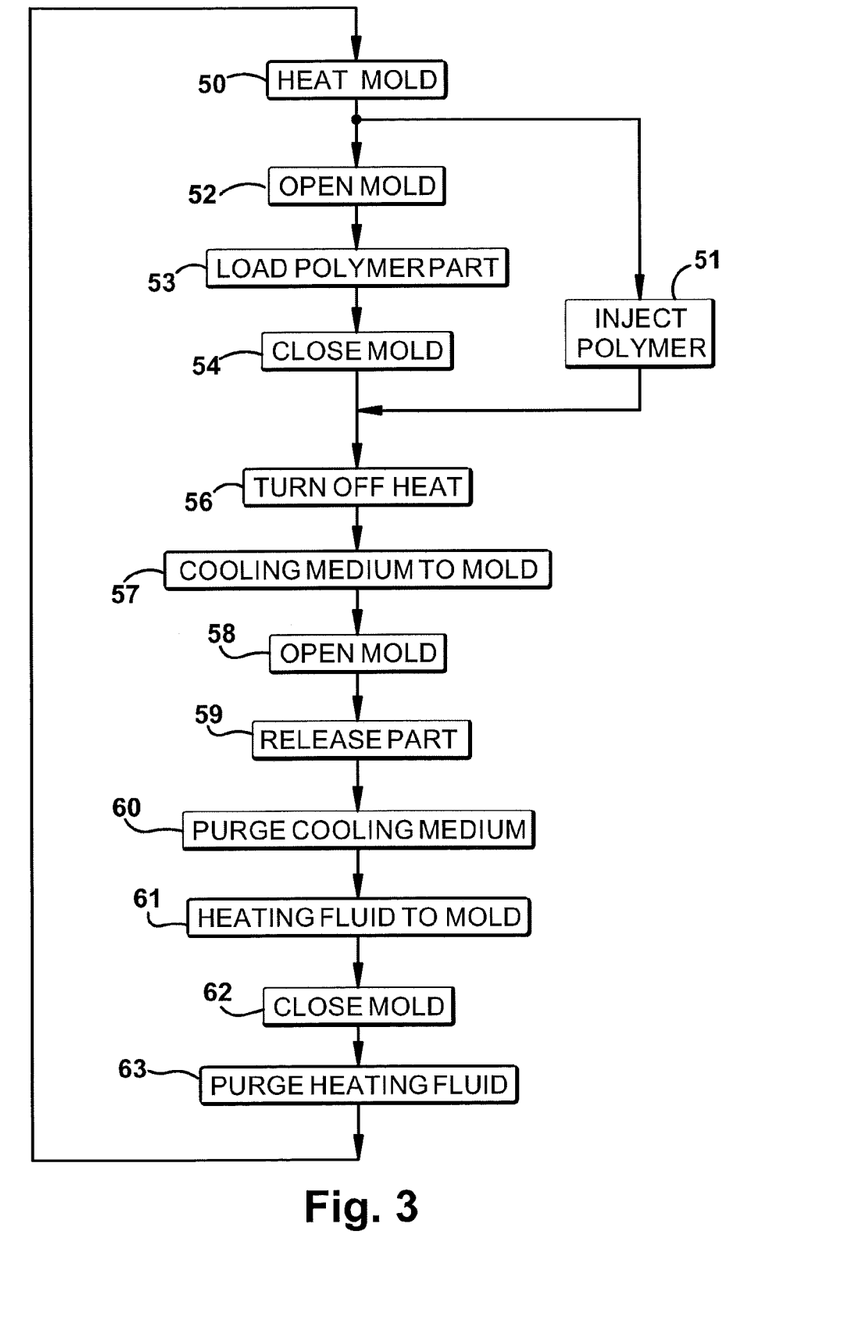
FIG. 3 is a flow chart of the molding cycle, according to an embodiment of the present invention.

The process for forming a polymer part, according to an example embodiment of the invention, can be described with reference to the flow chart shown in FIG. 3. FIG. 3 shows that initial step 50, the process can pertain to a multi-cycle molding process and the initial step can be one of several of the individual steps shown in FIG. 3. At step 50, the two mold halves, for example top and bottom mold portions 32, 34 (FIG. 2) are closed and the heat energy source or heating unit of molding apparatus 14 is energized. It should be noted that reference to the mold or the temperature of the mold can pertain to the entire mold or to one of the mold portions. In one embodiment of the invention, the temperature of the mold portions, for example top mold portion 32 and bottom mold portion 34 can be controlled independently such that one mold portion is heated or cooled to different temperatures and/or at different heat rates. The heat energy source is activated to raise the temperature of the mold to high temperatures, for example, up to about 250° C., in another example up to about 300° C., in another example up to about 350° C., and in another example up to about 400° C. to mold or form polymers having high melt or high glass transition temperatures.

If polymer is to be formed from molten polymer and injected into a closed mold, for example in the case of an injection molding process, then polymer is injected into the mold at step 51 and formed. If polymer is to be formed from a solid polymer part, then the mold is opened at step 52 to receive the polymer into the mold. Next, the solid polymer part, for example a flat sheet or pre-formed polymer solid, is placed between the mold halves at step 53. At step 54, the top and bottom mold portions are closed and the mold continues to be heated to a desired temperature. The polymer sheet or pre-form can be pre-heated, however, the mold surface of the mold cavity will also be heated to achieve the desired surface finish of the formed polymer part. To achieve an excellent surface finish, one or both of the mold surfaces 36, 38 (FIG. 2) can be heated to at least the melting temperature, Tm, of a polymer which is crystalline or semi-crystalline, or can be heated to a temperature that ranges from about 30° C. to about 100° C. above the glass transition temperature, Tg, of an amorphous polymer, for example, or as described above a forming temperature which will produce the desired cosmetic surface of the polymer part. The heated polymer then conforms to the geometric shape of the mold surfaces, and a polymer part having at least one "cosmetic surface" is produced.

At step 56 the heat energy to the mold is turned off. At step 57 the method further includes passing a cooling medium through the fluid passageways of the mold, for example fluid passageways 42, 44 (FIG. 2) to cool the mold and the formed polymer at a faster rate. Cooling occurs until the mold reaches the desired release or ejection temperature at which time the mold is opened at step 58. The polymer part is released from at least one of the mold halves and/or is ejected at step 59 just following the opening of the mold. The cooling medium is purged at step 60. The cooling medium can be purged prior to, during, or after reaching the release or ejection temperature, however, the cycle time can be reduced by forcing the cooling medium out of the system upon reaching the release or ejection temperature.

At step 61 the open mold is heated by heating fluid. The cooling medium described above can be purged by a gas such as air or can be purged by the heating fluid flowing through the fluid passageways of the mold. Heating fluid flows through the fluid passageways of the mold while the mold opens or closes, or both, in order to raise the temperature of the mold for the next part to be formed. In this manner the mold is being heated by the heating fluid before the mold can be closed and before a second heat source can be turned on or activated. For example, the heating fluid flowing through the mold at step 61 raises the temperature of the mold upon release or ejection of the part and before the mold is closed. It has been found, surprisingly, that the heating flux using hot fluid medium, for example hot water or hot oil, can approximate the heat flux using alternative heating methods, for example, induction heating. The heat flux supplied to the mold by a hot fluid medium is a function of the temperature differential between the mold and the heating fluid. That is, while the mold temperature is substantially cooler than the heating fluid, the high temperature difference between the two ensures a rapid transfer of heat from the heating fluid to the mold. Therefore, time can be saved and the molding cycle shortened by using the heating fluid to heat the mold prior to utilizing a second source of heat energy to heat the mold.

At step 62 the mold halves are closed and the heating fluid can continue to heat the mold when the mold is closed. The heating fluid is eventually purged at step 63 and a second source of heat energy is applied to heat the mold at step 50 described above to begin another cycle. The heating fluid can be purged at step 63 prior to, simultaneous with, or after the induction heat unit is turned on for the subsequent mold cycle at step 50, and these steps are interchangeable. The heat source at step 50 and the heating fluid can be operated simultaneously. However, when the mold temperature exceeds the temperature of the heating fluid it can be desirable to stop the flow of the hot medium and purge the lines with a gas such as air. At the point in time when the temperature of the mold exceeds the temperature of the heating fluid, the heating fluid becomes cool relative to the mold temperature the heating fluid is purged at step 63 so that the heating fluid does not cool the mold or impede the heat rate of the mold. The point at which the energy source applied to the mold switches from a heating fluid to an alternative heat energy source, depends at least in part on the temperature of the heating fluid, the geometry of the mold, and the properties of the mold material and the polymer being formed.

Applying the laws of heat transfer the rate of transfer of heat energy into the mold is proportional to the difference in temperature between the mold and the heating fluid according to the following simplified equation:

$$Q = h \cdot A \cdot \Delta T$$

where Q is the rate of transfer of heat energy, h is the convective heat transfer coefficient at the interface between the fluid and the mold, A is the surface area of the fluid channels across which the heat is transferred, and ΔT is the difference in temperature between the mold and the heating fluid. The convective heat transfer coefficient is determined mainly by the fluid properties, flow rate and geometry of the channel. The area, A, is the surface area of the fluid passageways 42, 44 (FIG. 2). Therefore, for a given geometry and flow rate of heating fluid, the heat transfer rate varies with the change in the ΔT.

As the mold temperature increases the heat flux drops and the rate of change of the mold temperature correspondingly drops. In order to achieve a higher mold temperature than the mold temperature raised by the heating fluid, and/or at an increased rate, a second energy source is used to heat the mold. The method of forming a polymer part can further include monitoring the heat flux of the mold while heating the mold by a first energy source and activating the second energy source to apply heat energy to the mold when the heat flux drops to a predetermined heat flux. That is, the method further includes signaling the second heat source to apply heat energy to the mold when the heat flux drops to a predetermined value. For example, a switch from one heat source to another can be dynamically controlled through a feedback loop to optimize the heat energy utilized. Also, once the second heat source is activated, the heating fluid can be purged by a gas to allow for a greater increase in the mold temperature, for example well beyond 200° C., or the temperature of the heating fluid, for example.

The method according to another embodiment of the present invention in which heat energy is provided specifically by both heating fluid and induction heat is described with reference to FIG. 3. In this embodiment, the heating fluid raises the temperature of the mold to a temperature that ranges from about 100° C. to about 200° C., and then an induction heating unit is activated to raise the temperature of the mold to substantially higher temperatures, for example, up to about 250° C., in another example up to about 300° C., in another example up to about 350° C., and in another example up to about 400° C. FIG. 3 shows that initial step 50, the two mold halves, for example top and bottom mold portions 32, 34 (FIG. 2) are closed and the induction heating unit of molding apparatus 14 is energized. The term "closed" when referring to a closed mold, means that the top and bottom mold portions, 32, 34 are in a position relative to the each other such that the induction heating unit located in the bottom mold portion 34 can link the magnetic field to the magnetic mold surface 36 of the upper mold portion 32. Therefore, an air gap may be present between the mold halves while the mold is in the closed position. If polymer is to be formed from molten polymer and injected into a closed mold, for example in the case of an injection molding process, then polymer is injected into the mold at step 51 and formed. If polymer is to be formed from a solid polymer part, then the mold is opened at step 52 to load the polymer into the mold. The induction heating unit can be turned off, or the presence of an air gap created between the mold halves when the mold is opened breaks the magnetic flux between the mold halves and turns off the induction heating unit. Next, the solid polymer part, for example a flat sheet or formed polymer part, is placed between the mold halves at step 53. At step 54, the top and bottom mold portions are closed and the induction heating coils are then again energized to resume heating the top mold surface 36 to a desired forming temperature. Once the polymer part is formed, the mold is cooled and the part is released or ejected as described above for steps 56, 57, 58 and 59 described above.

At step 61 the mold is being heated by the heating fluid before the mold is closed and before the induction heating unit is turned on or activated. That is during ejection of the part during the production cycle, the induction heating unit remains inactivated where the magnetic mold surface 36 is located a distance which is too far from the stator and coils of the induction heating unit.

At step 62 the mold halves are closed and the heating fluid can continue to heat the mold when the mold is closed. The heating fluid is purged at step 63 prior to, during, or after the next molding cycle begins at step 50 and the closed mold is heated by the induction heating unit.

Polymer materials which can be processed in the mold apparatus described above, can include thermoplastic, thermoset and mixtures thereof. Thermoplastic polymers can include, but are not limited to, polycarbonate (PC), polyetherimide (PEI), polyesters such as polyethylene terephthalate (PET) and polybutylene terephthalate (PBT), polyphenylene oxide (PPO), acrylonitrile butadiene styrene (ABS), acrylic styrene acrylonitrile (ASA), polypropylene (PP), polyethylene (PE), polyamides, and mixtures thereof, for example. Thermosetting polymers can include, but are not limited to, epoxy, phenolic, and polyester, for example. The polymers can be reinforced or non-reinforced with short, long or continuous carbon fibers, glass fibers, aramid, metallic, mineral or vegetable fibers.

In an example embodiment, a method for forming polymer which is polyester, such as a polybutylene teraphthalate (PBT), for the example, is described with reference to FIG. 2 employing heating fluid and induction heating to heat mold apparatus 14. As described above, mold apparatus 14 is single-sided induction heating unit in which the majority of the induction heat energy is dissipated by the top mold portion to produce a part having a cosmetic surface substantially free from imperfections formed against top mold surface 36 and a non-cosmetic surface which is formed by the bottom mold surface 38 at a temperature that is lower than the top mold surface 36.

The top and bottom mold surface 36, 38 can be heated using heating fluid, for example superheated steam such that the top and bottom mold surfaces are raised to a temperature between about 100° C. to about 200° C. The induction unit heats the mold surface to a temperature of greater than or equal to about 260° C., the melting temperature, Tm, of polyester. Maintaining the surface of the mold above the melting temperature ensures an excellent surface finish of the part. The induction heating unit is then turned off and the mold and polymer are cooled by passing cooling medium through the fluid passageways of the mold. The temperature of the cooling medium depends on the properties of the material being used. For example, the temperature of the cooling medium is chosen to ensure that the stiffness of the part is high enough to withstand ejection and that the shrinkage upon cooling is large enough to free the part from the mold surface. The mold is then opened so that the polymer part can be ejected from the mold. The cycle time is reduced when heating fluid having a temperature ranging from about 100° C. to about 200° C. is passed through the mold at least while the mold is open. The heating fluid can continue to flow through the mold while the mold is closed and until the temperature of the mold reaches up to about 200° C., the maximum desired temperature from this mode of heating.

Figure 4:
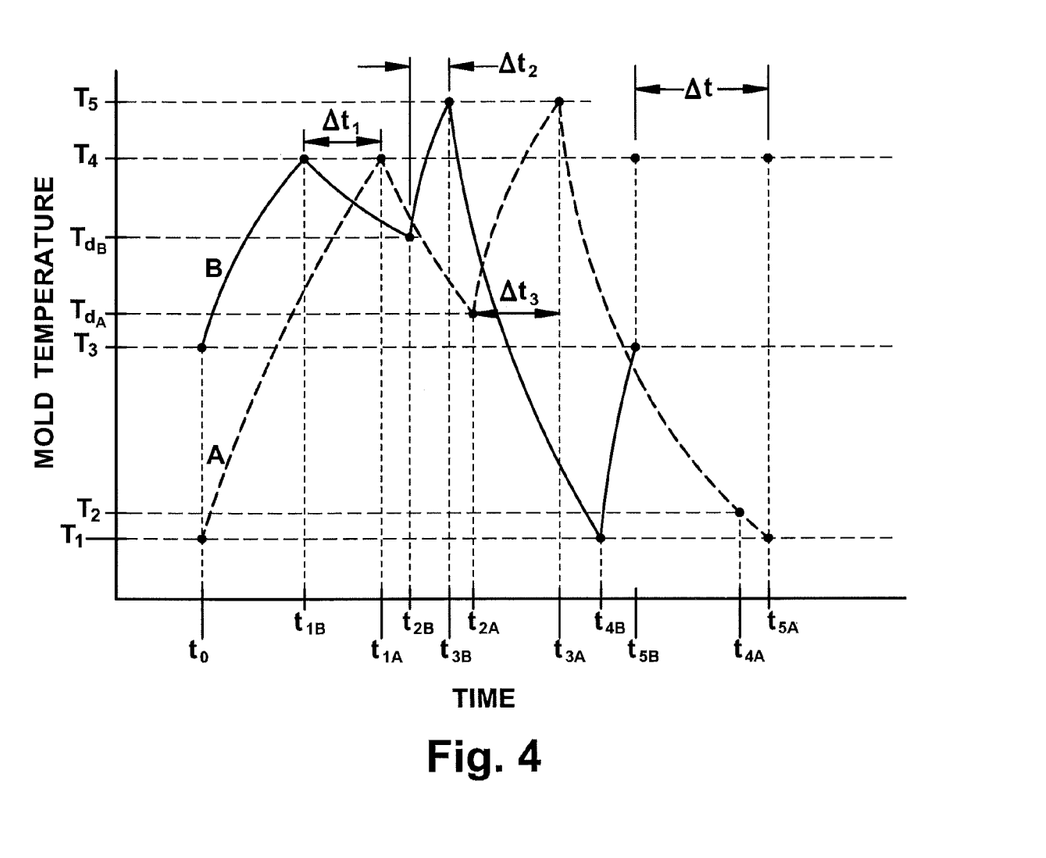
FIG. 4 is a graph showing the relationship of temperature and time during a molding cycle, according to an embodiment of the present invention.

FIG. 4 illustrates graph plots of mold temperature vs. time of a single mold cycle of two different methods for forming polymer. Plot A, shown in a dashed line, and plot B, shown in a solid line, pertain to methods for forming a solid polymer work piece, for example, a polymer sheet or pre-form in a thermoforming process. The plots of FIG. 4 are merely illustrative examples to point out relationships between different methods of forming polymer. The method of forming polymer as represented by plot A employs a heat energy source other than heating fluid, for example, such as, induction, radiation, etc. mentioned above, to heat the mold surface to a temperature that is greater than or equal to about 150° C., and more typically greater than or equal to about 200° C. The method of forming polymer as represented by plot B employs first heat energy source which is heating fluid and a second heat energy source that raises the mold temperature greater than the mold temperature achieved by the heating fluid. Both methods of forming polymer according to plot A and plot B also employ cooling medium during the cycle to cool the mold after forming the polymer. The actual temperature at any point in time of the process can vary according to many factors, such as, the specific polymer, the geometry of the polymer part to be formed, the type of heat source, and whether the polymer is injected or it is a pre-formed article of a particular temperature, etc., for example.

In FIG. 4, the starting point, time to, corresponds to a point at which heat energy is applied to a closed mold, for example step 50 of FIG. 3. Referring to plot A, the mold temperature is $T_1$, for example, ambient temperature, at the start of the cycle, time $t_0$. At time to the closed mold is heated, for example, by one of several heat sources capable of heating the mold surface to a temperature that is proximate to a forming temperature, $T_4$, suitable to form the polymer and/or to attain desired cosmetic surface quality of the part as described above. At time $t_{1A}$ the temperature of the mold reaches, or example, the forming temperature $T_4$ and the mold is opened so that a solid polymer can be formed and placed into the mold. Depending upon the heating method the heat source may be turned off for the period of time to load the solid polymer into the mold. For example, in the one-sided induction heating method described above, the induction heating coils no longer heat the mold between $t_{1A}$ and $t_{2A}$ when the mold is opened to load the polymer sheet or pre-form. In one example embodiment, the temperature of the mold drops to $Td_A$ at time $t_{2A}$ while the polymer part is placed into the mold. At time $t_{2A}$ the mold is closed and the induction heating unit is energized to resume heating the mold. The mold can optionally be heated beyond the forming temperature, for example, to temperature $T_5$ at time $t_{3A}$. At time $t_{3A}$, the mold is cooled, for example, by circulating cooling medium through the mold. The temperature of the mold surface drops to temperature $T_2$, for example the release or ejection temperature at time $t_{4A}$ and the mold is opened again for release and eventual ejection of the polymer part. The mold, while open, can continue to cool to temperature $T_1$ at time $t_{5A}$ at which time the mold is closed for the next cycle. At time $t_{5A}$ the heat energy source is activated to heat up the mold for the forming the next part in the following cycle.

Referring to plot B, at the start of the cycle, at time $t_0$ the mold temperature is $T_3$ which is higher than the starting temperature $T_1$ of the method for forming polymer of plot A. The difference in initial temperatures of these two methods is due to the use of heating fluid when the mold is open. At mold temperature $T_3$ the closed mold is heated by a suitable heat energy source, including heating fluid. Depending upon commercially available fluids, an alternate source of heat energy may be required to raise the mold temperature to temperature $T_4$ the molding or forming temperature of the polymer at time $t_{1B}$. At time $t_{1B}$, the mold is opened so that a solid polymer can be loaded into the mold. When the mold is opened, some heat energy sources, for example an induction heating unit, can no longer heat the mold and the temperature of the mold drops to $Td_B$ while the solid polymer sheet or pre-form is placed into the mold. The mold is closed at time $t_{2B}$ and the induction heating unit is energized to resume heating the mold. The mold can optionally be heated beyond the forming temperature, for example, to temperature $T_5$ at time $t_{3A}$. At time $t_{3B}$, the heat energy source is turned off, for example, an induction heating unit and the cooling medium is circulated through the mold. The temperature of the mold surface drops to temperature $T_1$ at time $t_{4B}$ at which point the mold is opened again for release and eventual ejection of the polymer part from the mold apparatus. Heating fluid is circulated through at least a portion of the mold, for example an upper mold portion, to heat the mold while the mold is open. The mold is heated and reaches temperature $T_3$ at time $t_{5B}$. At time $t_{5B}$ the mold is closed and the heating fluid continues to heat the mold, or an alternative heat source is turned on to begin the next molding cycle (step 50 of FIG. 3). The mold cycle represented by plot A ends at a mold temperature $T_1$ and the mold cycle represented by plot B ends at a higher mold temperature $T_3$ because the mold of method B is heated with heating fluid when the mold is open during ejection portion of the mold cycle.

Therefore, comparisons of plots A and B show that the overall cycle time for forming a polymer part can be substantially reduced when heating fluid is used as an energy heat source. In addition, the use of heating fluid can reduce the rate of power requirement necessitated by the alternative heat energy sources used during the mold cycle. The difference in the cycle times of method A and B, from time to $t_{5A}$ compared $t_0$ to $t_{5B}$, is delta t, $\Delta t$.

The cycle time difference between the two different methods of forming polymer represented by plots A and B is at least as great as the difference in the time, $\Delta t_1$, it takes in each method to reach the forming temperature $T_4$. This relationship can be represented by the equation:

$$\Delta t \approx \Delta t_1$$

The actual time savings, $\Delta t$, can be as long as the time it takes to open and close the mold for ejection of the polymer part during the cycle.

Additional savings in cycle time for method B can be realized when the process involves opening the mold to place a solid polymer sheet or pre-form between the mold portions. Since the mold temperature can drop during loading of the polymer work piece, the temperature of the mold does not drop as much, if at all, where the mold is heated by heating fluid. In FIG. 4 the temperature drop represented by $T_{dB}$ is less than the temperature drop represented by $T_{dA}$. The mold temperature at the surface or interface of the polymer does not drop as much because the heating fluid used in method B heats the mold to a greater depth into the mold compared to method A which uses alternative energy sources and no heating fluid to heat the mold. As a result, a greater time, $\Delta t_3$, is required to elevate the mold temperature to the forming temperature $T_4$ or beyond $T_5$ in method A compared to the time $\Delta t_2$ it takes to elevate the mold temperature to the forming temperature in method B. Therefore, the change in cycle time between the two different methods of forming polymer represented by plots A and B can also take into account the difference in the time it takes to recover from the temperature loss during loading. This additional cycle time savings of method B can be expressed by the following:

$$\Delta t > \Delta t_3 - \Delta t_2.$$

Therefore, the reduction in cycle time of method B which employs heating fluid as a heat source can be represented as follows:

$$\Delta t \gtrsim \Delta t_1 + [\Delta t_3 - \Delta t_2]$$

Therefore, the use of a heat energy source in the form of heating fluid followed by a second energy source can result in a shorter cycle time, however, the reduction in cycle time will also depend on the relative rate of heating by the two energy sources. It has been found that the rate of change in mold temperature, or heat flux, is approximately equal when the mold is heated by heating fluid or by an alternate energy source such as induction heating, for example. However, as the mold temperature increases, the heat flux drops and the second energy source can be activated to heat the mold beyond the temperature of the heating fluid.

As mentioned above, the use of heating fluid in conjunction with an alternative heat source can reduce peak power requirements demanded by a second energy source which draws from electrical energy, for example. In an embodiment of a method which heats with heating fluid followed by induction heating, the heating fluid functions as a thermal capacitor to reduce the power requirement of the induction heating unit to heat the mold. In addition, the use of a second heat source, for example, induction heat, achieves high mold temperatures in short cycle times because the mold surface is directly heated rather than the entire mold body. The instantaneous heating heats a thin layer of the mold without heat being conducted throughout the interior of the mold and therefore enabling faster cooling, and therefore, provides a method of producing molded articles having high, cosmetic surface quality in a short cycle time.

While embodiments of the invention have been described, it will be understood by those skilled in the art that various changes may be made and equivalents may be substituted for unit thereof without departing from the scope of the invention. For example, although example embodiments discussed above pertain to induction heat as a source of energy, it should be understood that several other types of heat energy can be used in conjunction with heating fluid to heat the mold. Also, several different polymers may be used. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a polymer part comprising:
   applying heat energy to a mold by a first energy source comprising heating fluid to heat the mold to a first mold temperature;
   applying heat energy to the mold by a second energy source which is different than the first energy source to heat the mold to a second mold temperature greater than the first mold temperature;
   purging the heating fluid prior to placing polymer into the mold cavity;
   placing polymer into a mold cavity of the mold after applying heat energy to the mold by the second energy source to form the polymer part;
   opening the mold upon cooling to release the polymer part from a portion of the mold; and
   heating the mold by heating fluid while the mold is open.

2. The method of claim 1, wherein the heating fluid raises the mold temperature to a temperature of about 100° C. to about 200° C.

3. The method of claim 2, wherein the second energy source is selected from the group: induction heat energy, infrared energy, resistive heat energy, laser heat energy, microwave energy, and combinations thereof.

4. The method of claim 1, wherein the second energy source is selected from the group: induction heat energy, infrared energy, resistive heat energy, laser heat energy, microwave energy, and combinations thereof.

5. The method of claim 1, wherein the second mold temperature greater than or equal to about 150° C.

6. The method of claim 1, wherein the second energy source is induction heat energy.

7. The method of claim 6, wherein:
   the mold has a first portion and a second portion; and
   heating the mold by a second energy source comprises energizing induction heating coils in first mold portion to heat the second mold portion.

8. The method of claim 1, wherein the heating fluid is selected from the group: water, oil, and mixtures thereof.

9. The method of claim 1, wherein:
   the mold comprises fluid passageways; and
   heating the mold by a first energy source comprises passing heating fluid through the fluid passageways of the mold.

10. The method of claim 1, wherein:
    the mold has a first mold portion and a second mold portion; and
    heating the mold comprises heating the first mold portion and the second mold portion independently.

11. The method of claim 1, wherein the heating fluid is purged while the second energy source is applied to the mold.

12. The method of claim 1, wherein the second mold temperature is greater than or equal to about 180° C.

13. The method of claim 1, further comprising cooling the mold after placing polymer into the mold cavity.

14. The method of claim 13, further comprising opening the mold upon cooling and ejecting the polymer part from the mold, and closing the mold.

15. The method of claim 1, wherein heating the mold comprises passing heating fluid through fluid passageways of the mold upon opening the mold.

16. The method of claim 1, further comprising monitoring the heat flux of the mold while heating the mold by a first energy source and activating the second energy source to apply heat energy to the mold when the heat flux drops to a predetermined heat flux.

17. The method of claim 1, wherein the polymer is placed into the mold by injecting molten polymer into the mold.

18. The method of claim 1, wherein the polymer is placed into the mold by loading solid polymer into the mold.

19. A method for forming a polymer part comprising:
    applying heat energy to a mold by a first energy source comprising heating fluid to heat the mold to a first mold temperature;
    applying heat energy to the mold by a second energy source which is different than the first energy source to heat the mold to a second mold temperature greater than the first mold temperature, and wherein the second mold temperature is greater than or equal to about 250° C.;
    placing polymer into a mold cavity of the mold after applying heat energy to the mold by the second energy source to form the polymer part;

opening the mold upon cooling to release the polymer part from a portion of the mold; and heating the mold by heating fluid while the mold is open.

20. A method for forming a polymer part comprising:

applying heat energy to a mold by a first energy source comprising heating fluid to heat the mold to a first mold temperature;

applying heat energy to the mold by a second energy source which is different than the first energy source to heat the mold to a second mold temperature greater than the first mold temperature;

placing polymer into a mold cavity of the mold after applying heat energy to the mold by the second energy source to form the polymer part;

wherein heating the mold to a first mold temperature comprises passing heating fluid through the mold during a time period which ranges from opening the mold to closing the mold;

wherein the mold has an upper mold portion comprising a top mold surface which is magnetic; and a bottom mold portion comprising an induction heating unit which is constructed and arranged to dissipate greater than about 50% of the induction heat energy to the top mold surface.

21. The method of claim 20, wherein the cooling the mold comprises passing cooling medium through fluid passageways of the mold and wherein the flow of heating fluid displaces the flow of cooling fluid from the mold.

22. A method for forming a polymer part comprising:

heating a mold with heating fluid to a first mold temperature;

heating the mold with induction heat energy source to heat the mold to a second mold temperature greater than the first mold temperature;

placing polymer into a mold cavity of the mold after applying heat energy to the mold by the induction heat energy source to form the polymer part;

opening the mold upon cooling to release the polymer part from a portion of the mold; and heating the mold by heating fluid while the mold is open, wherein the mold has an upper mold portion comprising a top mold surface which is magnetic; and a bottom mold portion comprising an induction heating unit which is constructed and arranged to dissipate greater than about 50% of the induction heat energy to the top mold surface.

23. The method of claim 22, wherein the first mold temperature is about 100° C. to about 200° C.

24. The method of claim 22, wherein:

the mold has a first mold portion and a second mold portion; and heating the mold comprises heating the first mold portion and the second mold portion independently.

25. The method of claim 22, further comprising purging the heating fluid prior to placing polymer into the mold cavity.

26. The method of claim 22, further comprising purging the heating fluid when the temperature of the mold is at least as great as the first mold temperature.

27. The method of claim 22, further comprising cooling the mold after placing polymer into the mold cavity.

28. The method of claim 22, further comprising monitoring heat flux across the mold while heating the mold with the heating fluid and activating the induction heat energy source to apply heat energy to the mold when the heat flux drops to a predetermined heat flux.

* * * * *